United States Patent
Adamson-Macedo (10) Patent No.: US 8,366,448 B2
(45) Date of Patent: Feb. 5, 2013

(54) EDUCATIONAL AID ARRANGED TO BE WORN BY AN INFANT OR INFIRM PERSON

(75) Inventor: Elvidina Nabuco Adamson-Macedo, Glendevon, By Dollar (GB)

(73) Assignee: Emeritus Elvidnan Adamson-Macedo, Glendevon, By Dollar (GB)

( * ) Notice: Subject to any disclaimer, the term of this patent is extended or adjusted under 35 U.S.C. 154(b) by 856 days.

(21) Appl. No.: 11/767,272

(22) Filed: Jun. 22, 2007

(65) Prior Publication Data

US 2007/0243510 A1 Oct. 18, 2007

Related U.S. Application Data

(63) Continuation-in-part of application No. PCT/GB2005/005015, filed on Dec. 22, 2005.

(51) Int. Cl.
*G09B 9/00* (2006.01)
(52) U.S. Cl. ........................................ 434/247
(58) Field of Classification Search .............. 434/112, 434/236, 247, 433; 2/159, 160, 161, 161.3
See application file for complete search history.

(56) References Cited

U.S. PATENT DOCUMENTS

| | | | | |
|---|---|---|---|---|
| 2,698,618 | A | * | 1/1955 | Evenstad ..................... 128/885 |
| 3,847,110 | A | * | 11/1974 | Inoue ........................... 116/223 |
| 4,517,424 | A | | 5/1985 | Kroczynski et al. |
| 4,519,781 | A | * | 5/1985 | Boyd ........................... 434/156 |
| 4,590,625 | A | | 5/1986 | Keim |
| 4,905,001 | A | * | 2/1990 | Penner ........................... 341/20 |
| 5,076,569 | A | | 12/1991 | Gootter et al. |
| 5,989,099 | A | | 11/1999 | Arnold, III et al. |
| 6,006,357 | A | * | 12/1999 | Mead ............................... 2/160 |
| 6,142,785 | A | * | 11/2000 | Williams ...................... 434/205 |
| 6,155,836 | A | * | 12/2000 | Hancock ....................... 434/188 |
| 6,244,271 | B1 | * | 6/2001 | Turner et al. ................. 128/869 |
| 6,393,614 | B1 | * | 5/2002 | Eichelbaum ..................... 2/160 |
| 6,558,165 | B1 | | 5/2003 | Curry et al. |
| 6,669,657 | B1 | | 12/2003 | Ongwela |
| 6,799,199 | B1 | * | 9/2004 | Segal et al. .................. 709/207 |
| 6,832,391 | B1 | | 12/2004 | Bower |
| 7,017,293 | B2 | * | 3/2006 | Riley .............................. 40/633 |
| D528,703 | S | * | 9/2006 | Smedi ....................... D29/117.1 |
| 7,296,999 | B2 | * | 11/2007 | Webber ........................ 434/168 |
| 2003/0000005 | A1 | | 1/2003 | Faulconer |
| 2003/0188373 | A1 | | 10/2003 | Garneau |
| 2003/0206834 | A1 | | 11/2003 | Chiao et al. |

FOREIGN PATENT DOCUMENTS

| | | |
|---|---|---|
| DE | 19626384 | 1/1998 |
| DE | 20104506 U1 | 3/2001 |
| DE | 10261731 A1 | 7/2004 |
| FR | 2574967 | 6/1986 |
| FR | 2824708 A1 | 11/2002 |
| GB | 2380393 A | 4/2003 |
| GB | 2396818 A | 7/2004 |
| JP | 2001003208 A | 1/2001 |

(Continued)

OTHER PUBLICATIONS

International Search Report and Written Opinion, PCT/US2005/016225, Dec. 28, 2005.

(Continued)

*Primary Examiner* — Kurt Fernstrom (57) ABSTRACT

An aid arranged to be worn by an infant or infirm person, the aid comprising a tactile pad and an attachment means, the attachment means is arranged to allow the aid to be worn such that the tactile pad is held on to or by the infant or infirm person. The attachment means may be a strap, sleeve or glove arranged to be worn on an infant's or infirm person's hand.

16 Claims, 7 Drawing Sheets

FOREIGN PATENT DOCUMENTS

| | | |
|---|---|---|
| WO | WO 0222066 | 3/2002 |
| WO | WO 03/052033 A3 | 6/2003 |
| WO | WO 2006067470 | 6/2006 |

OTHER PUBLICATIONS

PCT Preliminary on Patentability / International Search Report and Written Opinion, PCT/GB2005/005015, Dec. 12, 2005—(9 pages).

PCT Search Report and Written Opinion, PCT/GB2005/005015, Dec. 12, 2005—(14 pages).

United Kingdom Exam Report dated May 18, 2005, GB0428026.9—(3 pages).

United Kingdom Exam Report dated Apr. 14, 2009, GB0712331.8—(6 pages).

United Kingdom Exam Report dated Jun. 9, 2009, GB0712331.8—(3 pages).

United Kingdome Exam Report dated Oct. 21, 2009, GB0712331.8—(3 pages).

United Kingdom Exam Report dated Dec. 9, 2009, GB0712331.8—(3 pages).

United Kingdom Exam Report dated Dec. 16, 2009, GB0712331.8—(4 pages).

Kiddimoto Gloves (http://www.kiddimoto.co.uk/itemdetl.php/itempred/Yellow%20Glove)—(2 pages).

Louis Garneau Cycling Gloves ("First Treks.com")—(4 pages).

United Kingdom Exam Report dated Dec. 16, 2008, GB0712331.8—(5 pages).

* cited by examiner

EDUCATIONAL AID ARRANGED TO BE WORN BY AN INFANT OR INFIRM PERSON

CROSS-REFERENCE TO RELATED APPLICATIONS

This application claims priority from Great Britain Patent App. Ser. No. GB0428026.9, filed on 22 Dec. 2004, and is a continuation-in-part of PCT Application No. PCT/GB2005/005015, filed Dec. 22, 2005, the entireties of which are expressly incorporated by reference herein in their entireties.

FIELD OF THE INVENTION

This invention relates to an educational, occupational and developmental aid for an infant or an infirm person. In particular, but not exclusively, the aid may be for a premature (also known as pre-term) infant. Some embodiments of the invention may be arranged for infirm persons (which may be older children, adults, or the elderly) requiring stimulation of his/her tactile senses.

BACKGROUND OF THE INVENTION

By the standards of infants born full-term, pre-term infants are underdeveloped when they are born and often need specialist care and attention. Moreover, aids sometimes made available to infants born full term or to toddlers, etc. are not necessarily appropriate for pre-term infants which are of course physically smaller and require different kinds of stimulation when compared to older infants.

Research conducted into the sort of stimulation most helpful in the development of newborns, for example, by Steri, Lhote, and Dutilleul in Haptic Perception in Newborns Developmental Sciences (3:3 (200) pp 319-327) has purported that Haptic touch is important to development. Haptic touch relates to the feeling, sensation or perception and exploration or manipulation more than to the grasping of objects.

It has also been found that other infirm people, such as the elderly, can benefit from stimulation of the Haptic touch in order to increase his/her dexterity.

SUMMARY OF THE INVENTION

According to a first aspect of the invention there is provided an aid arranged to be worn by an infant or infirm person, the aid comprising a tactile pad and an attachment device, the attachment device arranged to allow the aid to be worn such that the tactile pad is held on or by the infant or infirm person.

Such an aid is advantageous because it may provide stimulation for the infant or infirm person and therefore improve the development of an infant or increase the dexterity of other wearers. The aid therefore may be classed an educational, occupational or a developmental aid.

In one embodiment the aid is particularly aimed at being worn by an infant and as such may be thought of as an infant aid. It will be appreciated that pre-term infants have a weak hand grasp and therefore it is advantageous to provide the attachment device so that an infant can take advantage of the aid although his/her grasp may be weak.

The tactile pad may be arranged to fit within the palm of the infant's or infirm persons hand.

In one embodiment the tactile pad is arranged to be worn on the hand of the infant or infirm person and preferably on the palm of the infirm person or infant's hand. Such an arrangement is convenient because it allows the infirm person or infant to touch the tactile pad with his/her digits.

The aid may be particularly arranged to be worn by a premature, or pre-term, infant. However, the device could be worn by other groups such as full term newly born babies, an infant, older children, adults, an elderly person, an ill person or an infirm person. Research has shown that stimulation of the senses without respecting the developmental sequence of the sensory system (in which touch develops first, then propioception, which is the sense of the position of parts of the body relative to other neighbouring parts of the body, followed by visual then auditory senses) may actually hinder the development of the infant. However, research has further shown that the development of pre-term infants can be greatly facilitated by the stimulation of touch, which is the most mature sense at birth.

Conveniently, the tactile pad has a profiled surface. Such a surface aims to provide a surface that an infant or infirm person wishes to manipulate and explore with his/her fingers—which may be the tips or pads of his/her fingers. Such exploration with the infirm person or infant's fingers allows the infant or infirm person to use so called "haptic" touch which allows him/her to gather information about the object. Contemporary evidence suggests that haptic touch is of more importance to infant development when compared to other forms of touch such as gripping or grasping and passive touch i.e. when the person explores an object which she/he is allowed to touch but not to grip, grasp or hold it.

The profiled surface may comprise a plurality of areas, each area having a different profile associated therewith. Such an arrangement is convenient because it may prove to be of more interest to the infirm person or infant and therefore provide more appropriate stimulation.

In an alternative, or additional, embodiment, the profiled surface may comprise a plurality of different profiles interspersed with one another. Again, such an arrangement is convenient because it may prove to be of more interest to the infirm person or infant and therefore provide more stimulation.

A profile may comprise any one or more of the following: a smooth area; a ridged area; a series of wavy lines; a bump; a zigzag pattern, a dotted area, a series of raised areas with smooth contours. Moreover, surface designs may be diverse so that, for example, a raised area or a bump may have a plan area that is roughly circular, or indeed may have a plan area that is roughly any other shape in plan such as square, rectangular, elliptical, a random shape, triangular or the like.

The aid may comprise a digit engagement arranged to engage at least one digit of an infirm person or infant's hand. Such an engagement is advantageous because it helps to ensure that the tactile pad is held in the correct position relative to an infirm person or infant's fingers.

In one embodiment, the digit engagement may be arranged to engage the middle finger of an infirm person or infant. Such an arrangement provides for a convenient structure of the attachment device and the digit engagement.

The digit engagement may be arranged to engage a plurality of digits of an infirm person or infant's hand. The plurality of digits may or may not include the middle finger of an infirm person or infant's hand. Such an arrangement may make the digit engagement more manageable; it will be appreciated that the individual digits of an infant are small and it may be easier to manipulate a plurality of digits at a time.

The digit engagement may be provided with an elongated portion in order that it can be more conveniently grasped and placed over an infirm person's finger(s).

In one embodiment, the digit engagement comprises a loop. The digit engagement may be fabricated from a resilient material allowing the digit engagement to be more readily passed around a particular digit of an infirm person or infant.

In a further embodiment, the digit engagement may comprise one or more bands, straps or the like arranged to pass between digits.

The aid may additionally comprise an actuator. The actuator may comprise a pressure sensitive device and/or a touch sensitive device. The actuator may provide an indication of one or more of the following: how often an infirm person or infant touches the aid; where an infirm person or infant touches the aid; how hard an infirm person or infant touches the aid. This may be advantageous in monitoring how the infirm person or infant reacts to the aid and may for example indicate a varying response to different profiles.

Used herein, a pressure sensitive device is intended to include devices activated by the application of pressure, for example, the pressure sensitive device may comprise switches or the like. A touch sensitive device is intended to include devices which are activated by touch but not necessarily pressure. For example, touch sensitive devices may comprise a touch sensitive screen arranged to detect changes in resistance, capacitance or surface acoustic waves or some other touch sensitive device. It will be appreciated that, while pressure sensitive devices tend to be mechanically and electronically simpler than touch sensitive devices, and therefore cheaper and more robust, a newly born baby is unlikely to exert much pressure and therefore a touch sensitive devices may be preferable in providing a reading for even light touches to the aid.

The aid may comprise a connection arranged to connect the pressure sensitive device and/or touch sensitive device to a monitor. This may provide a convenient method for measuring an infirm person or infant's interaction with the aid.

The attachment device may comprise a strap providing a convenient way of providing the attachment device that may be readily used to attach the aid to the infirm person or infant. The strap may be arranged to cover substantially all or all of the hand of an infirm person or infant.

Should a strap be provided, it may be separable and have a fastener provided therewith allowing the strap to be fastened to an infirm person or infant. In an alternative, or additional embodiment, the strap may be a single portion, preferably fabricated from a resilient material.

The fastener may comprise any of the following: VELCRO™, press-studs, ties, lacing, overlapping straps, watch straps, peg-and-hole, clasps. Such fasteners are advantageous because they provide convenient fasteners but also because they are safe to the infant or infirm person that is wearing the aid.

In other embodiments the attachment device may comprise a tube like member or sleeve. This may be advantageous as no material will then pass between an infirm person or infant's fingers, which may, if present, restrict the movement of the hand.

In other embodiments the attachment device may comprise a portion of a glove, preferably with at least a portion of at least one finger and/or thumb removed therefrom. In some embodiments, all the fingers and thumb may be removed from the glove. Removal of at least one digit (and preferably a plurality of digits) from the glove is advantageous because it may provide a greater degree of touch for the infant or infirm person to which the aid is attached.

The tactile pad may be fabricated from one or a combination of the following: fabrics, plastics or rubber-based material, natural rubber, latex, polyurethane, polymer gel materials.

The attachment device may be fabricated from one or a combination of the following: fabric, plastics or rubber-based material natural rubber latex, polyurethane, polymer gel materials.

In embodiments using fabric, the fabric may comprise natural or synthetic fibres. Synthetic fibres may be particularly advantageous as they can be easy to clean and may be softer than natural fibre.

In one possible embodiment, the tactile pad comprises a fabric base with plastic or rubber (foe example, silicone, natural rubber latex, polyurethane, polymer gel materials) features adhered thereto.

It may be advantageous to use medical grade silicone to form all or part of the tactile pad/attachment device, as this is unlikely to provoke an allergic reaction in an infant or infirm person.

The tactile pad may be releasably mounted on the attachment device. For example the tactile pad may be held to the attachment device via a fastener as previously discussed. Such an arrangement may provide for convenient cleaning of the attachment device and/or the tactile pad. However, it may be preferred to fixedly attach the tactile pad to the attachment device as, so joined, the parts are less likely to form a choking hazard. Indeed, in order to pass a 'choke hazard test', it may be necessary to attach the tactile pad to the attachment device.

According to a second aspect of the invention there is provided a method of stimulating an infirm person or infant comprising providing a tactile pad having a textured surface and arranged to be worn by the infirm person or infant and further arranged to provide tactile stimulation for the infirm person or infant.

The method preferably comprises providing the tactile pad so that it can be worn on a hand of the infirm person or infant.

Preferably the pad can be worn against the palm of the infirm person or infant's hand. Such a method is advantageous because the infirm person or infant does not have to hold the tactile pad and yet the infirm person or infant is able to explore the tactile pad with his/her digits.

The method may further comprise ensuring that the top joints of at least some of the infirm person or infant's fingers are left uncovered. In perhaps the most preferred embodiment the method comprises having the top joints of all of the infirm person or infant's fingers uncovered. This may be advantageous as the sensitivity of touch may be reduced if the fingers are covered, for example by fabric.

The method may further comprise providing the surface of the pad with a plurality of profiled areas. Such a method may provide the infirm person or infant with a plurality of surfaces that he/she can explore which may increase the likelihood of appropriate stimulation being given to the infant or infirm person.

According to a third aspect of the present invention, there is provided a method of measuring an infirm person or infant's use of haptic perception comprising providing a tactile pad having a textured surface and arranged to be worn by the infirm person or infant, providing said tactile pad with a touch sensing device capable of providing a signal indicative of a touch to the pad.

This may be advantageous as it provides a device for measuring the progress of an infirm person or infant. Further, it may be used to assess the level of interest of the infirm person or infant in a particular texture surface.

The method may further comprise providing a monitor arranged to receive said signal. The monitor may provide a readout comprising information relating to one or more of the following: placement of touch, duration of touch, pressure of touch. The readout may be provided on a screen. This may provide a convenient method of viewing the information obtained.

According to a fourth aspect of the invention there is provided a development aid for an infirm person or infant comprising a tactile pad and a strap arranged to hold the pad to an infirm person or infant's hand, wherein the tactile pad is held adjacent the infirm person or infant's palm and the strap fastens at the back of the hand and incorporates a digit engagement arranged to secure the position of the aid by passing over or between digits of the infirm person or infant.

Features described in relation to one aspect of the invention may relate to other aspects.

BRIEF DESCRIPTION OF THE DRAWINGS

There now follows, by way of example only, a detailed description of embodiments of the invention in relation to the accompanying figures, of which.

DETAILED DESCRIPTION OF THE DRAWIGNS

It is convenient to describe embodiments of the invention with reference to an educational aid for an infant which includes newly born full-term or preterm babies. However, the invention need not be so limited and may be applied to other infirm people such as older children, adults, the elderly or ill. The skilled person will readily appreciate how to modify the design described for an infant to other infirm people by altering the dimensions appropriately and any other necessary considerations.

Figure 1:
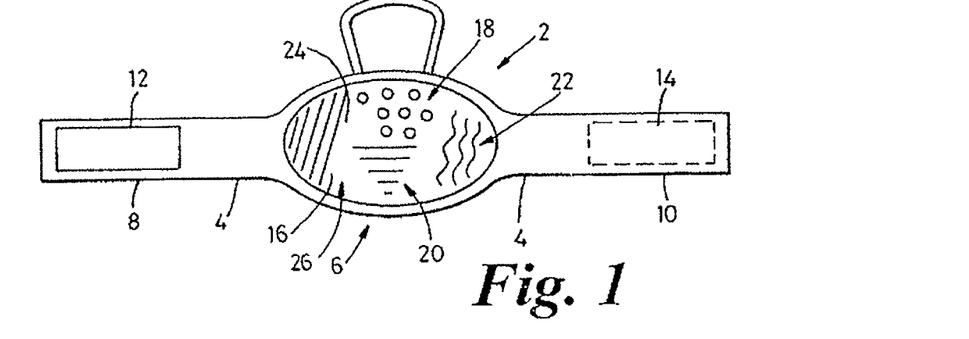
FIG. 1 shows a plan view of an aid according to an embodiment of the invention.

The aid 2 of FIG. 1 comprises a strap 4 on which a tactile pad 6 is mounted. The strap 4 provides an attachment device that allows the aid to be attached to an infant. As can be seen from FIG. 3 the tactile pad 6 is a domed shape and is fabricated from medical grade silicon.

Figure 3:
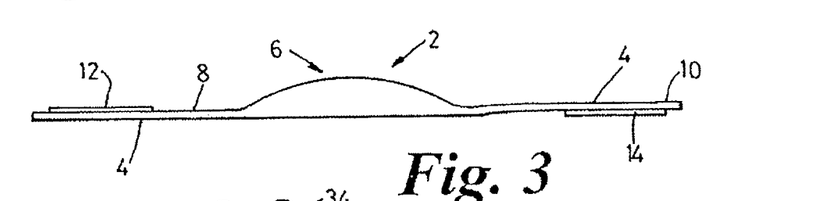
FIG. 3 shows a side profile view of the aid of FIG. 1.

In the embodiment of FIGS. 1 and 3, the strap 4 is separable into two portions 8, 10 and each portion of the strap 4 has a fastener 12, 14 allowing the two portions 8, 10 to be fastened together. In the embodiment shown in FIGS. 1 and 3 each portion of the fastener 12, 14 is a portion of VELCRO™; one portion 12 being the loop portion and the other portion 14 being the hook portion. The skilled person will appreciate that other forms of fastener are equally possible.

As can be seen from the plan view of FIG. 1 the tactile pad 6 has a surface 16 that comprises a plurality of areas 18,20, 22,24,26, each area having a different profile associated therewith. The various profiles are given by way of an example only and other profiles are equally possible. The profiles illustrated are as follows: area 18 comprises a plurality of roughly circular bumps; area 20 comprises an area of ridges roughly parallel with an axis through the strap 4; area 22 comprises a plurality of wavy ridges; area 24 comprises a plurality of ridges arranged roughly parallel to an axis transverse the axis through the strap 4; and area 26 comprises a substantially smooth area.

A digit engagement 28 in the form of a loop is attached to the tactile pad 6 and is fabricated from medical grade silicon. The digit engagement 28 is resilient allowing it to receive a digit, generally a finger, of an infant's hand.

Figure 4:
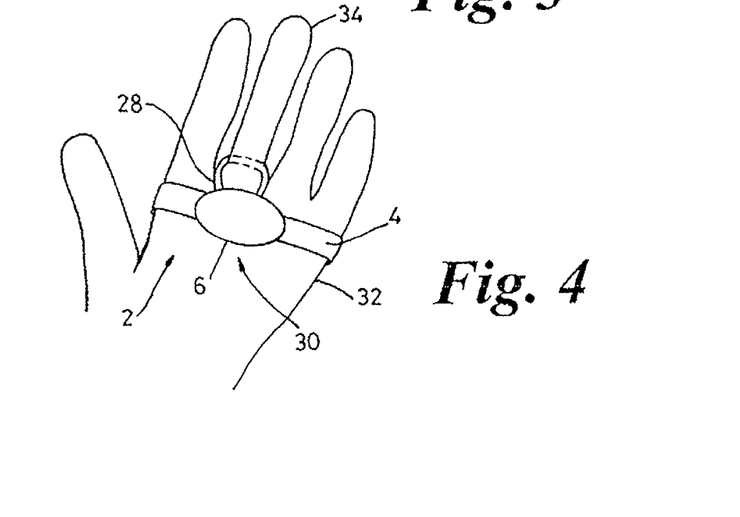
FIG. 4 shows a view of the aid of FIG. 1 or 2 placed on the hand of an infant.

The embodiment of FIG. 4 differs from that shown in FIGS. 1 and 3 because it has a strap comprising a single portion which consequently does not require a fastener 12, 14. The strap is made from a resilient material allowing it to expand such that it can comfortably accommodate an infant's hand. The resilient material may be medical grade silicone.

Figure 2:
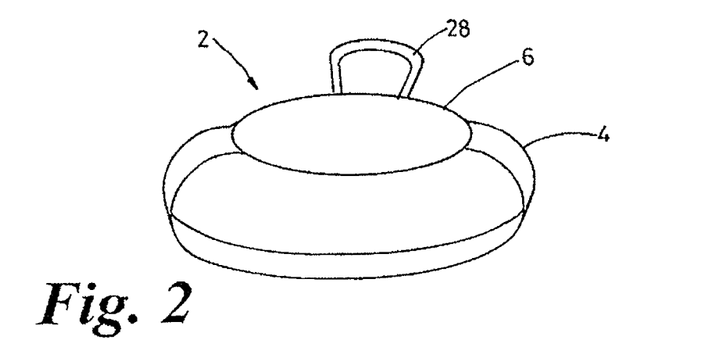
FIG. 2 shows a perspective view of an aid according to a further embodiment of the invention.

FIG. 4 shows the aid of FIGS. 1 to 3 placed on the palm 30 of an infant's hand 32. The embodiment of FIGS. 1 and 3 would be fastened around the hand such the fastener 12, 14 fastens adjacent the back of the infant's hand 32 and the embodiment of FIG. 2 is stretched such that the hand can be placed inside the strap 4. As can be seen from the Figure, the digit engagement 28 is passed around the middle finger 34 of the infant's hand 32. The resilient nature of the digit engagement 28 facilitates the insertion of the finger 34.

In use of the aid 2 the infant can curl his/her fingers and/or thumb such that the digits contact the tactile pad 6. The areas 18 to 26 of different profile on the tactile pad 6 provide a stimulating touch sensation that the infant can explore with his/her digits. Because the tactile pad 6 is held in place with the strap 4 there is no requirement for the infant to hold the aid. Therefore, the infant can rely on what is called "haptic" touch to explore the tactile pad 6, which, it is believed, provides a significant stimulation for the infant.

FIGS. 5 to 9 show alternative embodiments of an aid 2a, 2b, 2c, 2d with alternative fastening, each aid 2a, 2b 2c, 2d being formed in one piece from medical grade silicone.

Figure 5:
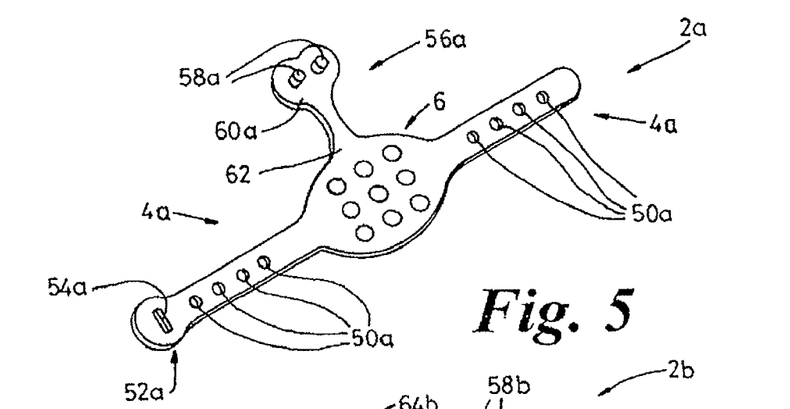
FIGS. 5 to 9 show further embodiments of an aid.

FIG. 5 shows an aid 2a comprising a substantially oval tactile pad 6 mounted on a central region of an elongate strap 4a. The strap 4a comprises a plurality of holes 50a aligned in a row and spatially separated along the length of the strap 4a to both sides of the tactile pad 6. The strap 4a further comprises at one end a widened portion 52a incorporating a slot 54a. The slot 54a is transverse with respect to the length of the strap 4a and is arranged such that the opposite end of the strap 4a may be passed therethrough. The aid 2a further comprises a fastener 56a comprising two pegs 58a mounted on a planar potion 60a attached to the tactile pad 6 by a stem 62. The stem 62 is arranged to pass between the digits of an infant. The pegs 58a are arranged such that they may be passed through the holes 50a and are held thereby, but may be pulled therefrom with reasonable ease.

In use of the aid 2a, the tactile pad 6 is laid in the palm of an infant. The stem 62 is wrapped in-between the fingers and placed against the back of the hand with such that the pegs 58a on the planar portion 60a face away from the hand. Each end of the strap 4a is then wrapped around the sides of the hand and one end is fed through the slot 54a. The strap 4a is fitted around the hand such that the holes 50a are aligned with at least two holes 50a overlapping, which overlapping holes 50a are placed over the pegs 58a. The pegs 58a are then pushed through the holes 50a.

Figure 6:
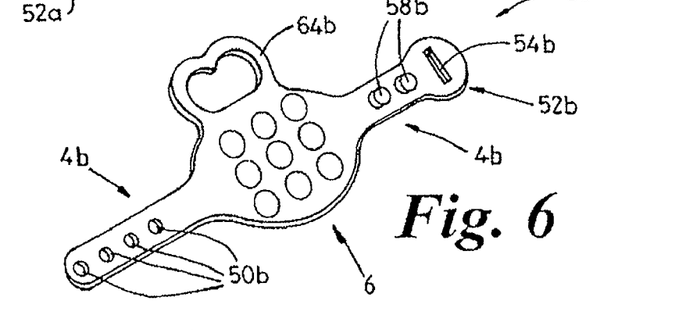

FIG. 6 shows an aid 2b comprising a substantially oval tactile pad 6 mounted on a central region of an elongate strap 4b. The strap 4b comprises a plurality of holes 50b aligned in a row and spatially separated along the length of the strap 4b to one side of the tactile pad 6. The strap 4b further comprises at one end a widened portion 52b incorporating a slot 54b. The slot 54b is transverse with respect to the length of the strap 4b and is arranged such that the opposite end of the strap 4b may be passed therethrough. The aid 2b further comprises a fastener comprising two pegs 58b mounted on the end of the strap without holes 50b. The pegs 58b are arranged such that they may be passed through the holes 50b and held thereby, but may be pulled therefrom with reasonable ease. The pad 2b further comprises a loop 64 protruding from the side of the pad 6 and arranged to pass over two fingers of an infant.

In use of the aid 2b, two fingers of an infant are fed through the loop 64 such that the tactile pad 6 is laid in the palm of an infant. Each end of the strap 4b is then wrapped around the sides of the infant's hand and one end is fed through the slot 54b. The strap 4b is fitted around the hand such that the holes 50b are aligned with at least two holes 50b placed over the pegs 58b. The pegs 58b are then pushed through the holes 50b.

Figures 7, 8:
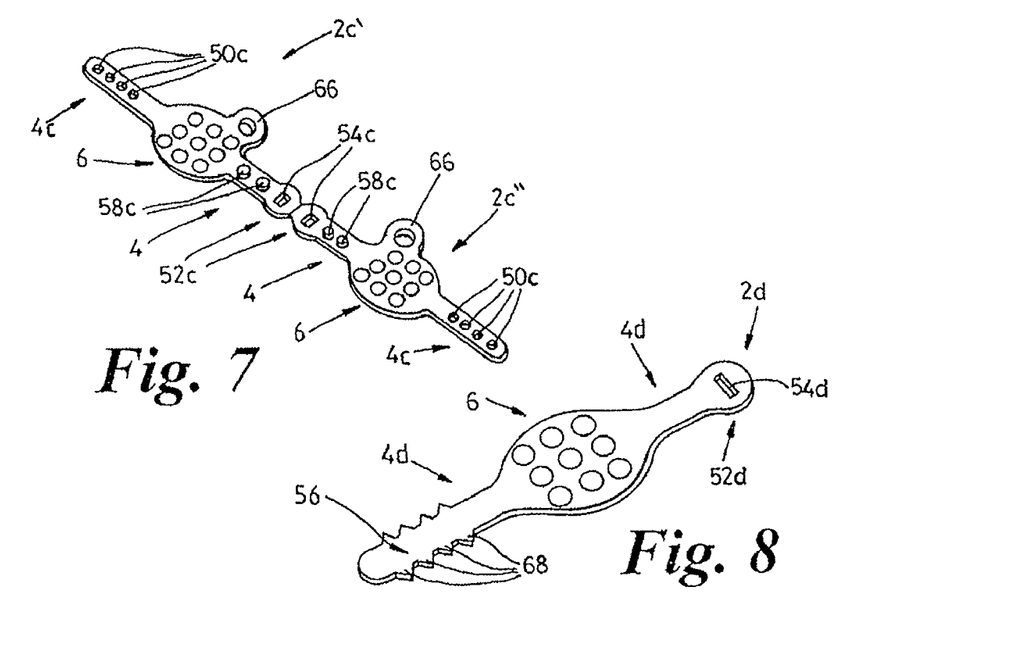

FIG. 7 shows two aids 2c', 2c", one being provide for the left hand and one for the right. As such the two aids 2c' and 2c" are mirror images of each other. Each pad comprises a substantially oval tactile pad 6 mounted on a central region of an elongate strap 4c. Each strap 4c comprises a plurality of holes 50c aligned in a row and spatially separated along the length of the strap 4c to one side of the tactile pad 6. The strap 4c further comprises at one end a widened portion 52c incorporating a slot 54c. The slot 54c is transverse with respect to the length of the strap 4c and is arranged such that the opposite end of the strap 4c may be passed therethrough. Each aid 2c' 2c" further comprises a fastener comprising two pegs 58c mounted on the end of the strap without holes 50c. The pegs 58c are arranged such that they may be passed through the holes 50c and are held thereby, but may be pulled therefrom with reasonable ease. Each pad 2c', 2c" further comprises a loop 66 protruding from the side of the pad 6 and arranged to pass over the thumb of an infant.

In use of the aid 2c', 2c", the thumb of an infant is fed through the loop 66 such that the tactile pad 6 is laid in the palm of an infant. Each end of the strap 4c is then wrapped around the sides of the infant's hand and one end is fed through the slot 54c. The strap 4c is fitted around the hand such that the holes 50c are aligned with at least two holes 50c placed over the pegs 58c. The pegs 58c are then pushed through the holes 50c.

FIG. 8 shows an aid 2d comprising a substantially oval tactile pad 6 mounted on a central region of an elongate strap 4d. The strap 4d comprises at one end a widened portion 52d incorporating a slot 54d. The slot 54d is transverse with respect to the length of the strap 4d and is arranged such that the opposite end of the strap 4d may be passed therethrough. The aid 2d further comprises a fastener 56 comprising a series of barbs 68 mounted on the end of the strap without the slot 54d. The barbs 68 are arranged such that they may be passed through the slot 54d with relative ease but greater force is need to pull the barbs 68 back though the slot 54d.

In use of the aid 2d, the tactile pad 6 is laid in the palm of the infant. Each end of the strap 4d is then wrapped around the sides of the infant's hand and the end incorporating the barbs 68 is fed through the slot 54d until the aid 2d is held securely to the hand.

Figure 9:
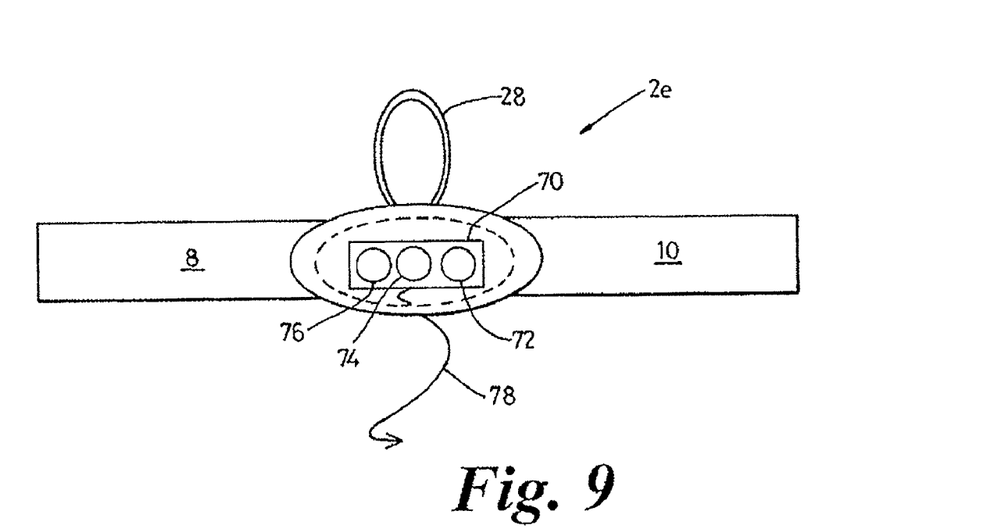

FIG. 9 shows a further embodiment of the present invention arranged to record the number and placement of touches received by a device. The aid 2e has many features in common with the embodiment of FIG. 1; like features have been labelled with like numbers and will not be described in detail. The aid 2e further incorporates beneath the tactile pad 6 a circuit board 70 and pressure sensitive regions 72, 74, 76. The pressure sensitive regions comprise rubber dome switches.

Such switches incorporate flexible rubber domes with a hard carbon centre. When pressure is applied to the dome, the carbon centre presses against a contact in the circuit board. As long as the pressure is maintained, the carbon centre remains in contact with the circuit board and a signal indicative that pressure has been applied to that pressure sensitive region is generated. When the pressure is removed, the rubber dome springs back to its original shape. The skilled person will appreciate that alternative pressure and/or touch sensitive device may also be appropriate for use with other embodiments of the present invention. The circuit board 70 has an output, in this case a USB cable 78. Other outputs such as wireless connections, for example radio links (including Bluetooth™ and the like), infrared, etc are equally possible and indeed have advantages in that no wires are present which may provide a hazard to an infant.

Figure 10:
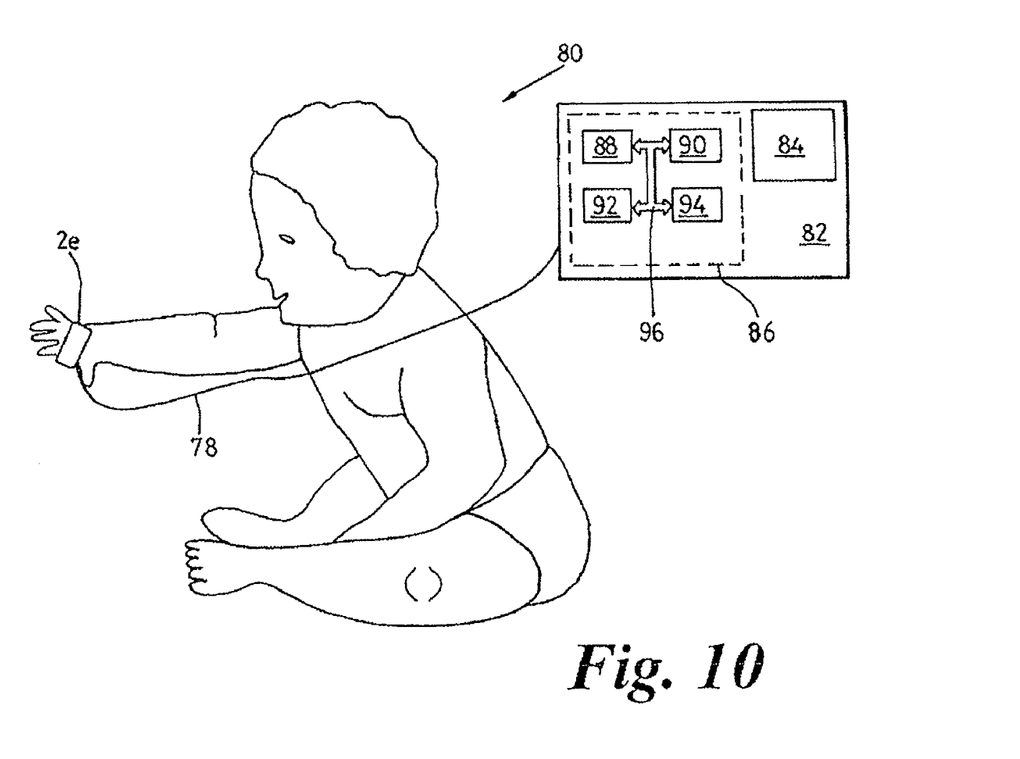
FIG. 10 shows the embodiment shown in FIG. 9 in use.

FIG. 10 shows the aid 2e worn by an infant 80. Clearly, the infant 80 shown is not a neonatal infant as it is sitting unsupported. However, it will be appreciated that the present invention may have particular advantages in its use with neonatal infants. The infant 80 is wearing the aid 2e on one hand and the cable 78 leads to a monitor 82. The monitor 82 comprises processing circuitry 86, comprising a processing unit 88, a hard drive 90, a memory 92, an I/O subsystem 94 and a system bus 96. The processing unit 88, hard drive 90, memory 92 and I/O subsystem 94 communicate with each other via the system bus 96, which in this embodiment is a PCI bus, in a manner well known in the art.

The monitor 82 also incorporates a screen 84, providing a readout. When the infant 80 touches one of the pressure sensitive regions 72, 74, 76, a signal indicative of the region touched as well as the length of time for which pressure is applied is produced an supplied to the I/O subsystem 94 of the monitor 82. This is passed to the processing unit 88 where it is process according to instructions stored on the hard drive 90 or in the memory 92. The result of the processing is then displayed on the screen 84.

The processing circuitry 86 may be arranged to produce information such as how the frequency of touch changes with time, with different devices, with age or the infant. Alternatively, it could display how long touch is maintained or trends associated with this. Other information could also be obtained.

It will be appreciated that the information gained in relation to the area touched and the length of time for which touch is maintained could be obtained through careful observation but that monitoring the pressure sensitive regions 72, 74, 76 electronically is likely to produce a more accurate result.

Figure 11:
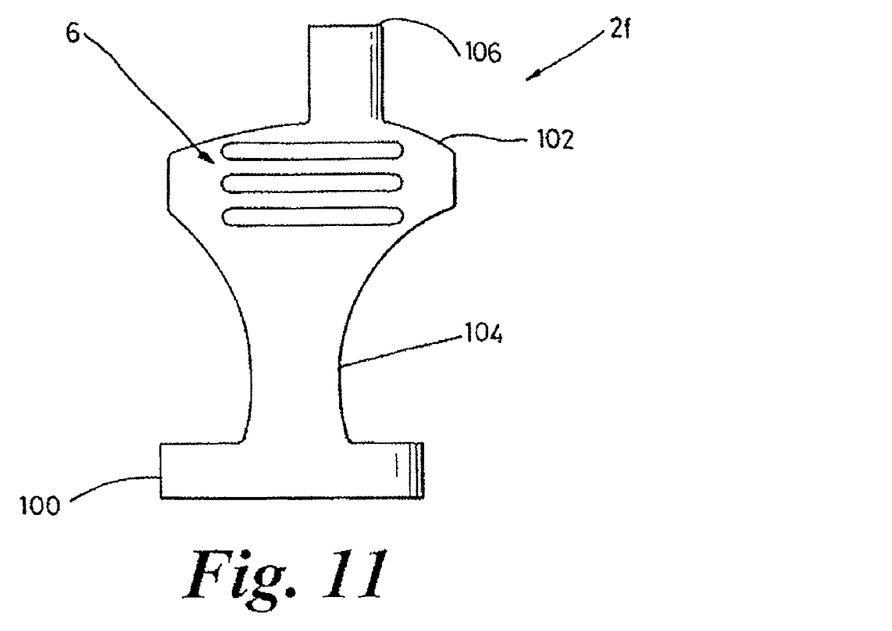
FIGS. 11 and 12 show perspective views of a further embodiment of an aid.
Figure 12:
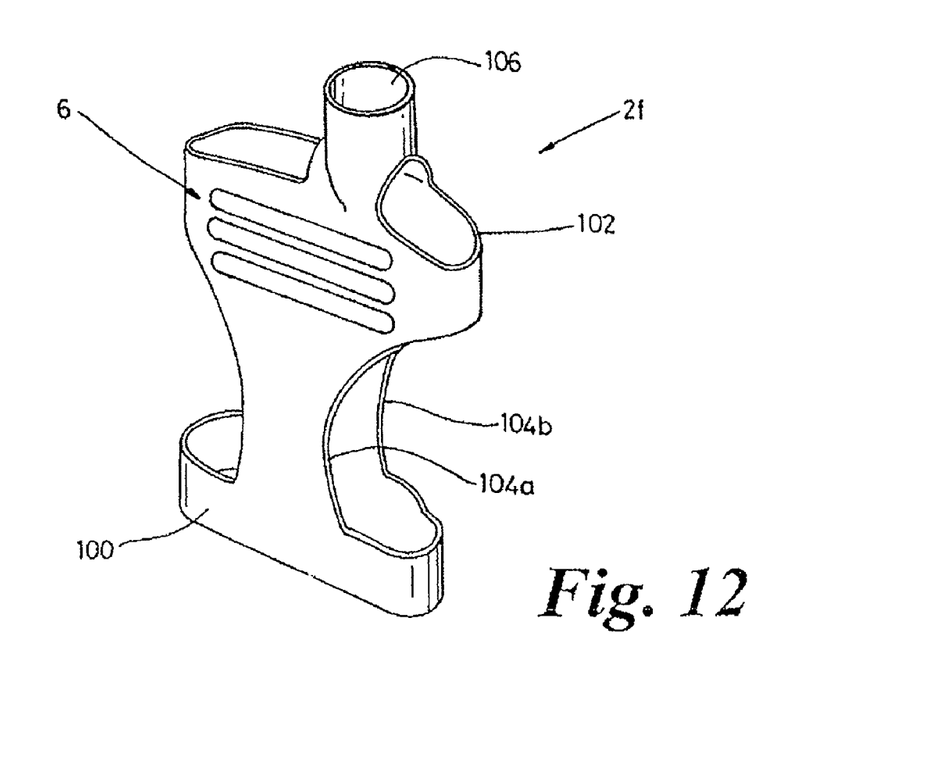

A further embodiment of an aid 2f is shown in FIG. 11 and 12 in which the attachment device comprises a portion of a glove. The aid 2f comprises a moulding of medical grade silicone and is formed like glove comprising a hand-covering portion and a finger-covering portion. Portions have been removed from the sides of the hand-covering portion, and all but the ring finger removed from the finger-covering portion. Further, the top of the ring finger is cut off such that a finger inserted would protrude therefrom. Looked at another way, the aid 2f comprises a substantially oval wristband 100 connected to a substantially oval knuckle band 102 by two substantially rectangular connecting members 104a, 104b arranged to lie, in use of the aid 2f, across the palm and the back of a hand of an infant. The knuckle band 102 has attached thereto a substantially cylindrical finger sleeve 106. The sleeve 106 is connected to the knuckle band 102 at two diametrically opposed sides of one end. The tactile pad 6 of this embodiment comprises an embossed region on the connecting member 104, in the pictured example comprising three parallel ridges. In an alternative embodiment, the wristband 100 may be split across its width to allow the aid 2f to be readily placed about an infant's hand.

In use of the aid 2f, an infant's hand is fed through the wristband 100 and then the knuckle band 102, with the ring finger being passed through the finger sleeve 106 and the connecting members 104a, 104b lying across the infant's palm and running up the back of the hand respectively. The infant is now free to touch the tactile pad 6 with its fingers and thumb (although it will be appreciated that movement of the ring finger may be restricted somewhat by the finger sleeve 106.)

Figure 13:
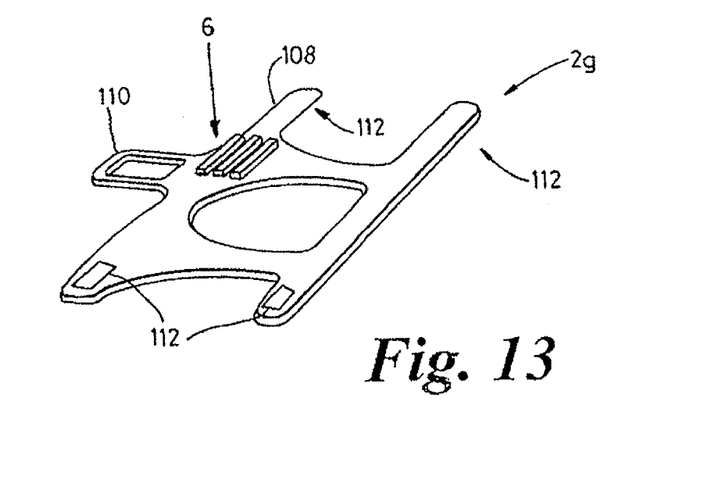
FIGS. 13 and 14 show perspective views of a further embodiment of the aid.
Figure 14:
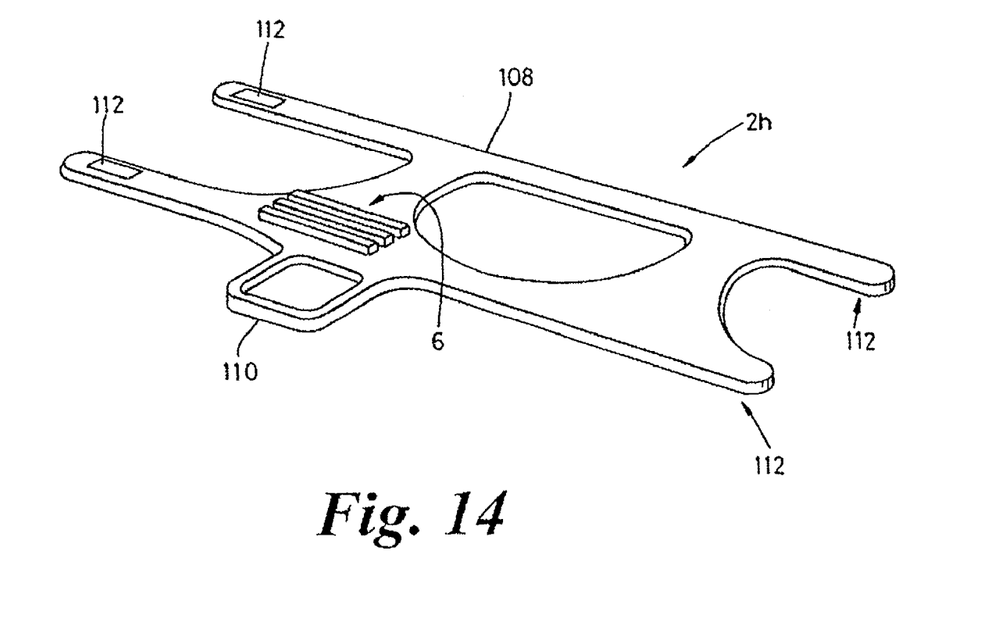

A further embodiment of an aid 2g, 2h is shown in FIGS. 13 and 14, in which attachment device comprises a wrap-around strap. The aids 2g, 2h shown are different sizes for use with infants at different stages of development. The aids 2g, 2h are formed of a press moulding of polyurethane comprising a wrap-around hand-covering portion 108 which may be wrapped around the infant's palm and the back of the hand with a digit engagement loop 110 arranged to be inserted over the middle finger of an infant's hand. Portions have been removed from the hand-covering portion 108 to allow for freedom of movement and to minimize the material required to form the aid 2f, 2h. The hand-covering portion 108 further comprises fastener in the form of VELCRO™ pads 112 at its extremities. The tactile pad 6 of this embodiment comprises an embossed region on the hand covering portion 108 and, in the pictured example comprising three parallel ridges. In the pictured embodiment, the ridges are moulded into the hand-covering portion. However, it will be appreciated that in alternative embodiments, the tactile pad may comprise elements which are attached to the hand-covering portion 108 after moulding, for example by adhesive. The elements may have been formed by injection moulding or may be stamped from a sheet.

In use of the aid 2g, 2h, an infant's finger is fed through the digit engagement loop 110 and the hand-covering portion 108 is wrapped around the hand and the VELCRO™ pads are brought together at the back of the hand to secure the aid 2g, 2h. The infant is now free to touch the tactile pad 6 with its fingers and thumb.

Figure 15:
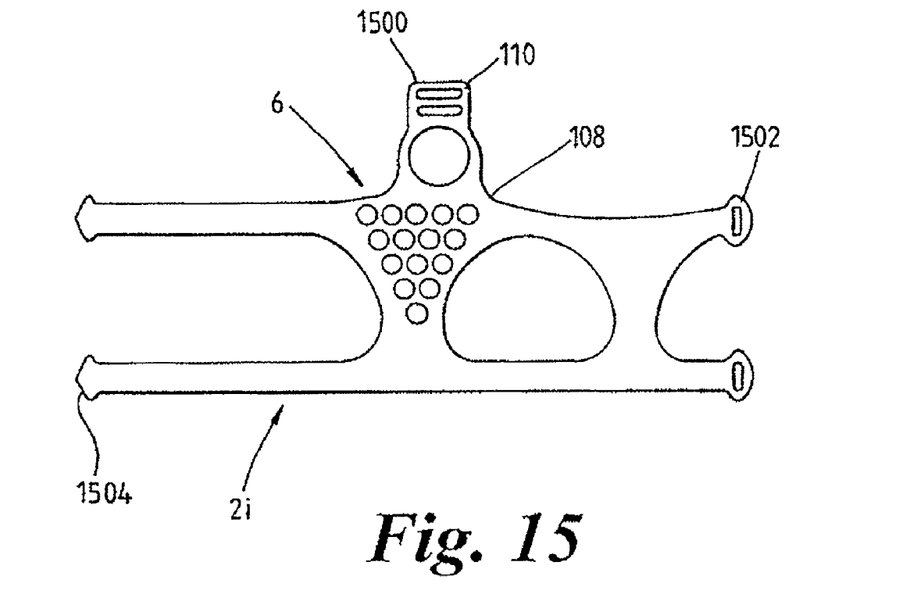
FIGS. 15 and 16 show views of a further embodiment of the aid.
Figure 16:
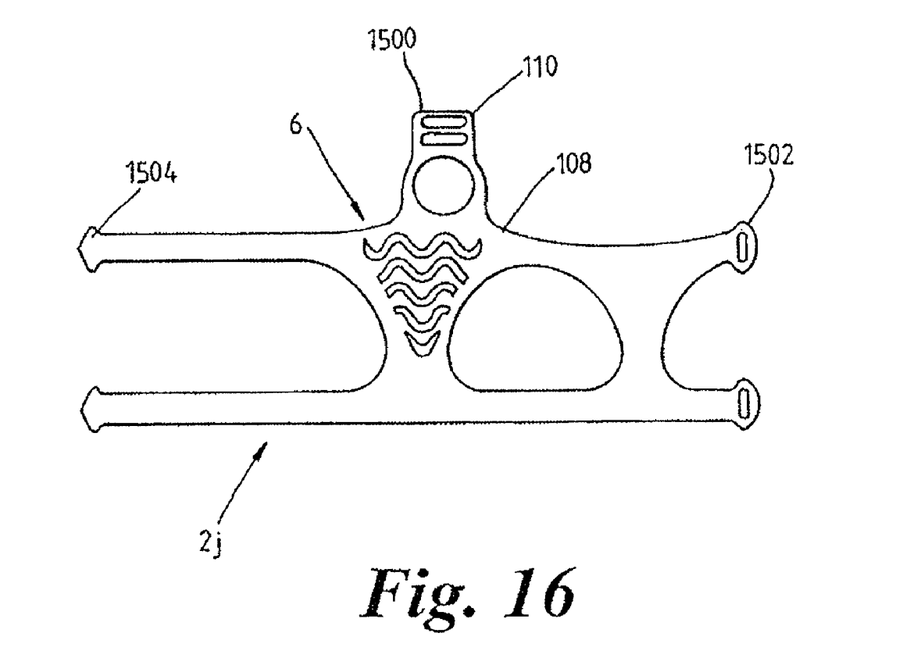

A further embodiment of an aid 2i and 2j is shown respectively in FIGS. 15 and 16. The embodiments shown in these Figures are largely similar to those of FIGS. 13 and 14 but with some modifications which will now be explained. Further, the embodiment shown in FIGS. 15 and 16 are the same as one another but for the design of the pattern of the tactile pad 6 thereon. The tactile pad 6 of the embodiment of FIG. 15 comprises a series of dimples whereas the tactile pad 6 of the embodiment of FIG. 16 comprises a series of wavy lines.

When compared to the embodiment of FIGS. 13 and 14 it will be seen that the digit engagement loop 110 has an elongated portion 1500 which is advantageous because it provide more material for a person hold as the digit engagement loop is passed over an the fingers of a wearer.

A further difference when compared with the embodiment of FIGS. 13 and 14 is the structure of the fastener used to secure the hand covering portion 108. In this embodiment the fastener comprise a loop 1502 and an engagement portion 1504 of greater width than the hole of the loop 1502. In use, the engagement portion 1504 is fed through the loop 1502 (which is possible due to the flexible nature of the material from which the aid is fabricated) and retained thereby.

It is convenient to manufacture the embodiment of FIGS. 15 and 16, or indeed any of the other embodiments, from SEBS (styrene-ethylene-butadiene-styrene) which is a Food and Drug Administration (FDA) approved plastics material. This is found to be convenient because of the friction what it provides such that the engagement portion 1504 is readily maintained through the loop 1502 due to the high friction that this plastics material experiences with itself.

Figure 17:
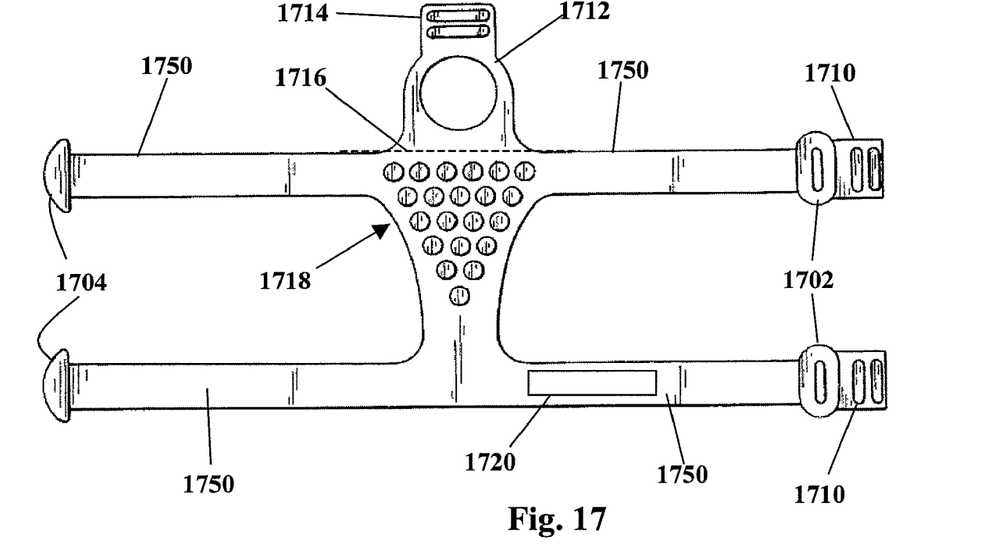
FIG. 17 shows a plan view of a further embodiment.

FIG. 17 shows a further embodiment in plan. It is convenient to highlight differences between the embodiment of FIG. 17 and preceding embodiments.

Figure 18:
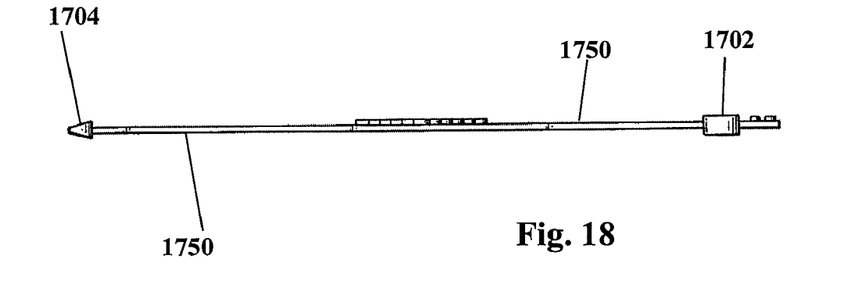
FIG. 18 shows an elevation of the embodiment of FIG. 17.

In particular, engagement portions 1704, at end regions of a strap 1750, have an increased height relative to the strap 1750 and this is best seen in FIG. 18. Further end regions of the strap 1750 have loops 1702, which together with the engagement portion 1704 provide a fastener. Thus, as with other embodiments, the strap is separable and can be connected together using the fastener.

In this embodiment, the loops 1702 have associated therewith tabs 1710 which provide an area for a user to hold and as such facilitate insertion of the engagement portions 1704 through the loops 1702.

As with other embodiments, a digit engagement 1712 is provide and arranged to pass around the middle finger of a wearer. A further tab 1714 is provided in association with the digit engagement 1712 to facilitate the digit engagement being passed over the finger of a wearer.

In this embodiment, each of the tabs 1710, 1714 is provided with two ridges to further provide grip for a user. In other embodiments other surface profiles may be provided to provide grip.

In this embodiment, it can be seen that a bottom edge of the hole that provides the digit engagement is above a line 1716 which extends across the tactile pad 1718 in line with the top edges of the strap 1750. Such an arrangement has been found advantageous as it can help to make the digit engagement more flexible to allow a wearer to curl his/her fingers to touch the tactile pad 1718.

Some embodiments of the invention may comprise a display region 1720 which may be used to display information. The information may comprise identity information about the wearer such as name, date of birth, identity number, address or the like. It will be appreciated that hospital patients often wear identity bracelets and the addition of a display region may allow the aid to provide the function of an identity bracelet as well as the educational aid.

The display region may be provided by any suitable mechanism. For example, the strap may comprise a pocket or the like into which a label may be inserted, perhaps through a slot in the strap. Alternatively, or additionally, as shown in FIG. 17, the display region may comprise a region of material which can be marked with a writing implement such as a pen. The region of material may comprise the fabric of the strap, the fabric of the strap which has a different surface finish from other areas of the strap or may comprise a further material adhered to the strap, or any other suitable finish.

Although shown on the embodiment of FIG. 17, the display region may be provided on any of the other embodiments which are shown. Further, although shown on the strap, the display region may be provided on other parts of the aid, such as in a region of the tactile pad, on a rear face of the tactile pad, etc.

The display region may be arranged such that the information thereby is what may be termed permanently displayed; i.e. it is difficult to remove the information without causing damage to the either the display region and/or the aid. For example, if a pocket is provided, an adhesive, or the like, may be provided to seal the pocket. In other embodiments, the pocket may be arranged to be heat sealed. Alternatively, or additionally, the surface of the display region may be fabricated such that it designed to be written on by a suitable writing implement, such as a permanent marker.

Some embodiments of the invention may provide additional stimulation for the infant or infirm person. This additional stimulation may be arranged to stimulate any one or more of the other senses of the wearer (i.e. the smell, sight, hearing or taste).

For example, some embodiments may be impregnated with a substance arranged to evaporate to generate a smell. Some embodiments of the invention may be provided with light emitters such as LED's, light bulbs or the like in order to stimulate the sight of a wearer. Some embodiments may be arranged to generate sound, and as such comprise a sound emitter, which may be via electronics, or via the material from which it is made. Other embodiments may be fabricated from a material which has a distinctive taste.

The invention claimed is:

1. A developmental aid arranged to be worn by a premature baby, or pre-term infant or a full term newly born baby or infant, the aid comprising a tactile pad arranged to be worn on a hand of the baby in a region of the palm such that the tactile pad fits substantially within the palm and having a plurality of textured surfaces and an attachment device, the attachment device arranged to allow the aid to be worn such that the tactile pad is held on or by the baby, the attachment device comprising at least one of a strap, a tube like member or sleeve, a portion of a glove; wherein the aid is arranged such that the wearer can, in use, curl his/her finger(s) and/or thumb such that a tip or fleshy finger pad of his/her finger(s) and/or thumb contact the tactile pad using haptic touch, in which each textured surface has a profile which comprises at least one from the group comprising: a bump; a series of wavy lines; a zigzag pattern; a dotted area; a series of raised areas with smooth contours; a raised area with a plain area that is roughly one of the following shapes: circular, square, rectangular, elliptical, triangular.

2. An aid according to claim 1 which comprises a digit engagement arranged to engage at least one digit of baby's hand.

3. An aid according to claim 2 in which the digit engagement is fabricated from a resilient material.

4. An aid according to claim 1 in which the attachment device comprises a strap and wherein the strap is fabricated from a resilient material.

5. An aid according to claim 1 in which the attachment device comprises a strap and wherein the strap is separable and has a fastener provided therewith allowing the strap to be fastened to a baby.

6. An aid according to claim 1 in which the tactile pad is fabricated from at least one from the group comprising: fabrics, plastics or rubber-based material, a fabric base with plastic or rubber features adhered thereto, medical grade silicone natural rubber latex, polyurethane, polymer gel materials.

7. An aid according to claim 1 in which the attachment device is fabricated from at least one from the group comprising: fabric, plastics or rubber-based material, medical grade silicone, natural rubber latex, polyurethane, polymer gel materials.

8. An aid according to claim 1 in which the tactile pad is releasably mounted on the attachment device.

9. An aid according to claim 1 in which the pad is arranged to stimulate at least one sense of the wearer in addition to touch; the one or more senses selected from the group consisting of any one or more of taste; sight; hearing; smell.

10. An aid according to claim 1 which comprises a display region arranged to display information.

11. An aid according to claim 2 in which the digit engagement is arranged to engage at least one of the ring finger and middle finger of a baby.

12. An aid according to claim 2 in which the digit engagement comprises a loop.

13. An aid according to claim 1 in which the tactile pad is flexible.

14. An aid according to claim 1 wherein the attachment device includes a slot configured to receive an opposing end of the attachment device to secure the attachment device to the wearer.

15. A developmental aid arranged to be worn by a premature baby, or pre-term infant or a full term newly born baby or infant, the aid comprising a tactile pad arranged to be worn on a hand of the baby in a region of the palm such that the tactile pad fits substantially within the palm and having at least one textured surface and an attachment device, the attachment device arranged to allow the aid to be worn such that the tactile pad is held on or by the baby, the attachment device comprising at least one of a strap, a tube-like member or sleeve, a portion of a glove; wherein the aid is arranged such that the wearer can, in use, curl his/her finger(s) and/or thumb such that a tip or fleshy finger pad of his/her finger(s) and/or thumb contacts the tactile pad using haptic touch and wherein the or each textured surface has a profile which comprises at least one from the group comprising: a bump; a series of wavy lines; a zigzag pattern; a dotted area; a series of raised areas with smooth contours; a raised area with a plain area that is roughly one of the following shapes: circular, square, rectangular, elliptical, triangular.

16. A developmental aid arranged to be worn by a premature baby, or pre-term infant or a full term newly born baby or infant, the aid comprising a tactile pad arranged to be worn on a hand of the baby in a region of the palm such that the tactile pad fits substantially within the palm and having a textured surface, and an attachment device, the attachment device arranged to allow the aid to be worn such that the tactile pad is held on or by the baby, the attachment device comprising at least one of a strap, a tube-like member or sleeve, a portion of a glove; wherein the aid is arranged such that the wearer can, in use, curl his/her finger(s) and/or thumb such that a tip or fleshy finger pad of his/her finger(s) and/or thumb contacts the tactile pad using haptic touch and wherein and wherein the tactile pad is flexible, in which the textured surface has a profile which comprises at least one from the group comprising: a bump; a series of wavy lines; a zigzag pattern; a dotted area; a series of raised areas with smooth contours; a raised area with a plain area that is roughly one of the following shapes: circular, square, rectangular, elliptical, triangular.

* * * * *